United States Patent
Hernandez Covarrubias et al.

(10) Patent No.: US 11,851,012 B2
(45) Date of Patent: Dec. 26, 2023

(54) FLEXIBLE BUS BAR

(71) Applicant: GM Global Technology Operations LLC, Detroit, MI (US)

(72) Inventors: Alejandro Hernandez Covarrubias, Toluca (MX); Francisco David Velasco, Toluca (MX); Manuel Garduno, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 476 days.

(21) Appl. No.: 17/226,806

(22) Filed: Apr. 9, 2021

(65) Prior Publication Data

US 2022/0324400 A1    Oct. 13, 2022

(51) Int. Cl.
| | |
|---|---|
| *B60R 16/00* | (2006.01) |
| *B60R 16/03* | (2006.01) |
| *H01R 25/14* | (2006.01) |
| *H02G 5/06* | (2006.01) |

(52) U.S. Cl.
CPC ........... *B60R 16/03* (2013.01); *H01R 25/145* (2013.01); *H02G 5/06* (2013.01)

(58) Field of Classification Search
CPC ......... B60R 16/03; H01R 25/145; H02G 5/06
See application file for complete search history.

(56) References Cited

U.S. PATENT DOCUMENTS

| | | | | |
|---|---|---|---|---|
| 2013/0207612 A1* | 8/2013 | Lev | ....................... | H02J 7/0036 |
| | | | | 429/158 |
| 2016/0301057 A1* | 10/2016 | Subramanian | ...... | H01M 10/482 |
| 2016/0301058 A1* | 10/2016 | Tyler | ................... | H01M 10/482 |

OTHER PUBLICATIONS

WO 2021039344A1 (Year: 2019).*
Park KR20100054626A; English Translation (Year: 2010).*

* cited by examiner

*Primary Examiner* — Pete T Lee
(74) *Attorney, Agent, or Firm* — Vivacqua Crane, PLLC

(57) ABSTRACT

An automotive busbar includes a first rigid section and a second rigid section, each of the first and second rigid sections formed from a first conductive metallic material and having a first effective cross-sectional area, and a flexible section positioned between and interconnecting the first and second rigid sections, the flexible section made from a second conductive metallic material and having a second effective cross sectional area, and a top surface and a bottom surface, at least one of the top and bottom surface including a plurality of voids formed therein and spaced along the flexible section, wherein, the second effective cross-sectional area is less than the first effective cross-sectional area and the second conductive material has a higher conductivity than the first conductive material.

20 Claims, 3 Drawing Sheets

FLEXIBLE BUS BAR

INTRODUCTION

The present disclosure relates to a bus bar for an automobile. More specifically, the present disclosure relates to a bus bar for an automobile having a flexible section.

A busbar is an electrical conductor adapted to connect several electrical outputs to a common power source within an automobile. A key strategy for the worldwide automotive industry is to design vehicles that incorporate leading-edge advances in electric power capabilities. Designs with enhanced electronics and sensing capabilities throughout the vehicle have been dictated not only by consumer preference and intense competition, but also by requirements for comfort, convenience, safety and environmental protection.

In recent years, these requirements for increased use of electric power have been accelerated by the intense development of hybrid-electric or electric vehicles. Just a few years ago, the typical car's electric power request might have been around 1 kW. Presently, the automobile electrical system requires approximately 3 kW. Contrast this with an average of 30 kW for a hybrid-electric vehicle, and 50 kW for an entire electric vehicle.

Given the electric vehicle's insatiable appetite for electric power, methods for assembling a car's electrical power architecture become critical, both for safety and performance. Bus Bars help dissipate high voltage power off the battery and transmit to various power-demanding locations within the car. In contrast to power cables, busbars make it possible to achieve power distribution with high power density. The material composition and cross-sectional size of the busbar determine the maximum amount of current that can be safely carried. Thus, as electrical demands within the automobile increase, the size of automotive busbars increase. In addition, a busbar must be sufficiently rigid to support its own weight, and forces imposed by mechanical vibration.

Interest in electric vehicles (EVs) and hybrid electric vehicles (HEVs) is growing steadily as battery technologies improve and the driving range of such vehicles increases. Perhaps as important, EVs/HEVs offer a "green" alternative to traditional vehicles powered by internal-combustion gasoline engines. Busbars in EVs/HEVs are essentially for transferring electrical energy from the large high-power battery pack to the inverter for conversion to AC electricity for use by the electric engine.

As busbars for automobiles increase in size, installation within the automobile becomes an issue, Components within an automobile are packaged tightly and there is very little open space to allow easy installation of a busbar. One installation option is to bend or fold the busbar to a more compact shape for insertion within a space within the automobile. Once in the proper location, the busbar is un-folded and bent back to its proper shape and secured in place. However, as the busbar is made from a rigid metallic material any bending or deformation of the busbar from its proper shape will result in plastic deformation of the busbar, resulting in undesirable profiles when the busbar is bent back to its proper shape. Any deviation from the proper shape of the busbar will prevent the busbar from fitting precisely within the space intended for it.

Thus, while current automotive busbars achieve their intended purpose, there is a need for a new and improved busbar including flexible sections that allow the busbar to be folded into a more compact shape for insertion within a space within the automobile, and to be un-folded back to its proper shape to be secured in place within the automobile.

SUMMARY

According to several aspects of the present disclosure, an automotive busbar includes a first rigid section and a second rigid section, each of the first and second rigid sections formed from a first conductive metallic material and having a first effective cross-sectional area, and a flexible section positioned between and interconnecting the first and second rigid sections, the flexible section made from a second conductive metallic material and having a second effective cross sectional area, a top surface and a bottom surface, at least one of the top and bottom surface including a plurality of voids formed therein and spaced along the flexible section, wherein, the second effective cross-sectional area is less than the first effective cross-sectional area and the second conductive material has a higher conductivity than the first conductive material.

According to another aspect, the flexible section comprises one of a single-sided notched profile and a double-sided notched profile.

According to another aspect, the flexible section comprises one of a square wave form profile, a triangular wave from profile and a sinusoidal wave form profile.

According to another aspect, the busbar further includes a flexible insulation coating encapsulating the flexible section and filling the voids formed therein.

According to another aspect, the flexible insulation coating has a portion adjacent one of the top and bottom surfaces that is thicker than a corresponding portion adjacent an opposite one of the top and bottom surfaces.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
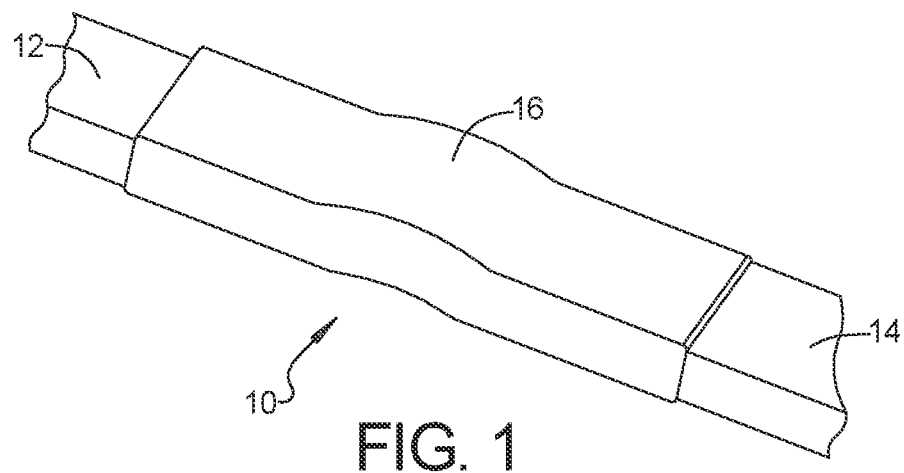
FIG. 1 is a perspective view of a portion of an automotive busbar according to an exemplary embodiment.

Referring to FIG. 1, an automotive busbar 10 according to the present disclosure includes a first rigid section 12, a second rigid section 14, and a flexible section 16 positioned between and interconnecting the first and second rigid sections 12, 14. The flexible section 16 is adapted to allow the busbar 10 to be folded into a more compact shape for insertion within a space within an automobile. Once the busbar 10 is positioned within a space within the automobile, the flexible section 16 is adapted to allow the busbar 10 to be un-folded back to its proper shape, after which, the busbar 10 can be secured in place within the automobile.

A busbar 10 is an electrical conductor adapted to connect several electrical outputs to a common power source within an automobile. Thus, each of the first rigid section 12, the second rigid section 14 and the flexible section 16 are made from a conductive metallic material.

Figure 2:
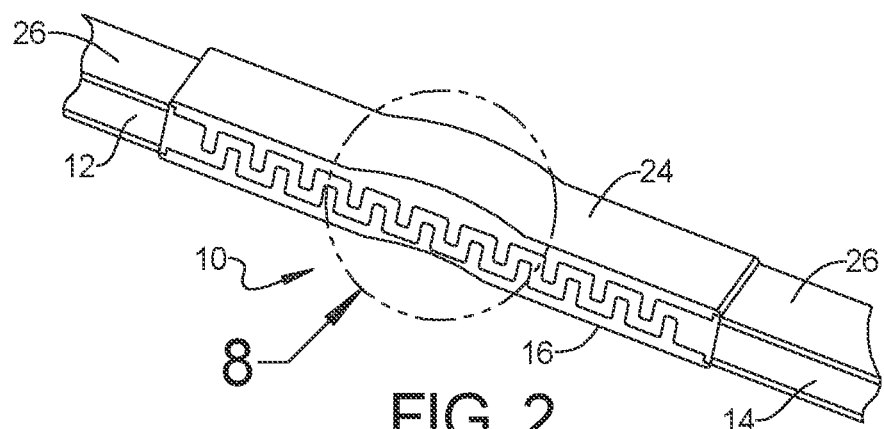
FIG. 2 is a sectional view taken along line 2-2 in FIG. 1.
Figure 3A:
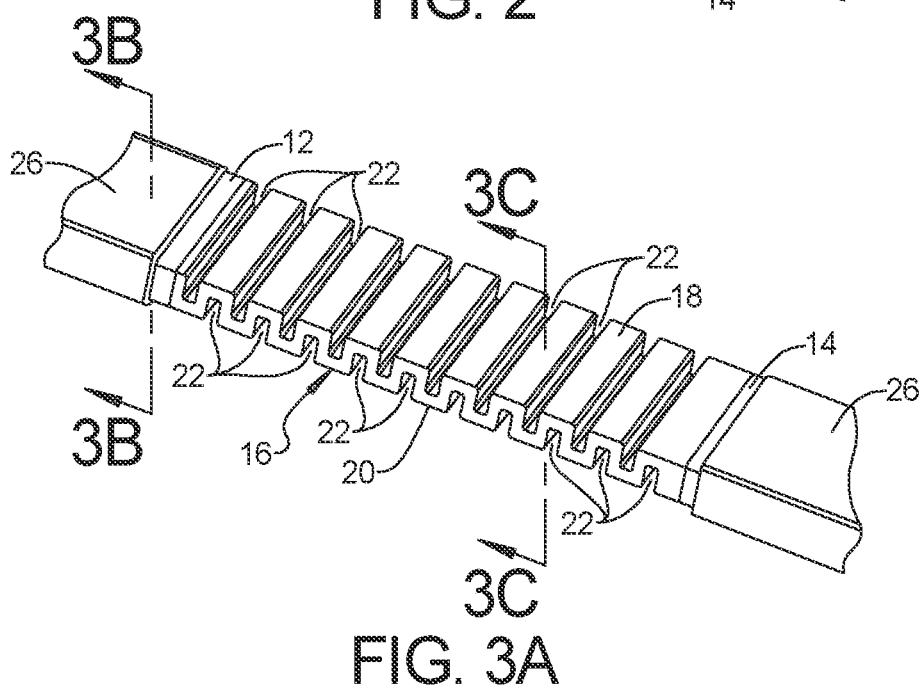
FIG. 3A is a perspective view of the portion of an automotive busbar shown in FIG. 1, shown without a flexible coating, wherein a flexible section includes a square wave form profile.
Figure 3B:
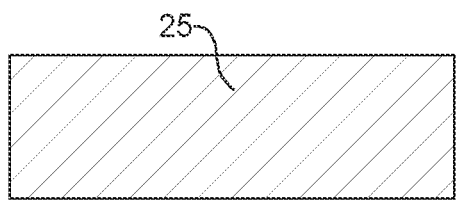
FIG. 3B is a sectional view taken along line 3B-3B of FIG. 3A.
Figure 3C:
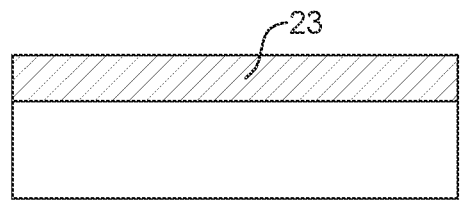
FIG. 3C is a sectional view taken along line 3C-3C of FIG. 3A.

The flexible section 16 is adapted to allow the busbar 10 to be bent or folded, and to encourage bending/folding at the flexible section 16. Further, the flexible section 16 is adapted to allow the busbar 10 to be un-folded, or bent back to its original shape, without any resulting undesirable profiles that deviate from the original shape of the busbar 10. Referring to FIG. 2 and FIG. 3A, in an exemplary embodiment, the flexible section 16 includes a top surface 18 and a bottom surface 20. At least one of the top and bottom surfaces 18, 20 includes a plurality of voids 22 formed therein and spaced along the flexible section 16. Referring to FIG. 3B and FIG. 3C, the voids 22 reduce an effective cross-sectional area 23 of the flexible section 16, such that the effective cross-sectional area 23 of the flexible section 16 is less than an effective cross-sectional area 25 of the first and second rigid sections 12, 14. Because the cross-sectional area 23 of the flexible section 16 is less than the effective cross-sectional area 25 of the first and second rigid sections 12, 14, the flexible section 16 is weaker than the first and second rigid sections 12, 14, and bending of the busbar 10 is focused at the flexible section 16.

Further, the voids 22 allow bending of the busbar 10 within the flexible section 16 with less plastic deformation than would result from bending the larger cross-section of the first and second rigid sections 12, 14. This allows the flexible section 16 to be un-folded, or bent back to its original shape with little or no resulting undesirable profiles.

To function properly, the flexible section 16 must conduct current at least as efficiently as the first and second rigid sections 12, 14. Because the flexible section 16 has a smaller effective cross-sectional area 23 than the first and second rigid sections 12, 14, the flexible section 16 must be made from a different material than the first and second rigid sections 12, 14. If the flexible section 16 were made from the same material as the first and second rigid sections 12, 14, the reduced effective cross-sectional area 23 of the flexible section 16 would result in heat building up within the flexible section 16 due to the reduced current path. Thus, in an exemplary embodiment, the first and second rigid sections 12, 14 are formed from a first conductive metallic material and the flexible section 16 is formed from a second conductive metallic material. The second conductive metallic material has a higher conductivity than the first conductive metallic material.

Conductivity, or specific conductance, is a measure of a material's ability to conduct electric current. Electrical conductivity in metals is a result of the movement of electrically charged particles. The atoms of metal elements are characterized by the presence of valence electrons, which are electrons in the outer shell of an atom that are free to move about. It is these "free electrons" that allow metals to conduct an electric current. Because valence electrons are free to move, they can travel through the lattice that forms the physical structure of a metal. The transfer of energy is strongest when there is little resistance. By the same token, the most effective conductors of electricity are metals that have a single valence electron that is free to move and causes a strong repelling reaction in other electrons. This is the case in the most conductive metals, such as silver, gold, and copper. Each has a single valence electron that moves with little resistance and causes a strong repelling reaction.

Thus, to offset the fact that the flexible section 16 has a smaller effective cross-sectional area 23, the flexible section 16 must be made from a material having higher conductivity than the first and second rigid sections 12, 14. In an exemplary embodiment, the first and second rigid sections 12, 14 are made from aluminum and the flexible section 16 is made from copper. The conductivity of copper is roughly twice that of aluminum, such that the busbar 10 conducts electrical current through the first and second rigid sections 12, 14 and the flexible section 16 nearly equally.

Figure 4:
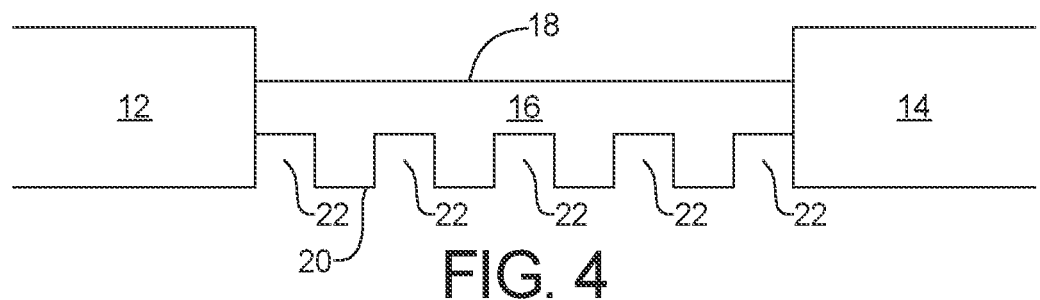
FIG. 4 is side view of an automotive busbar, wherein a flexible section includes a single sided notched profile.
Figure 5:
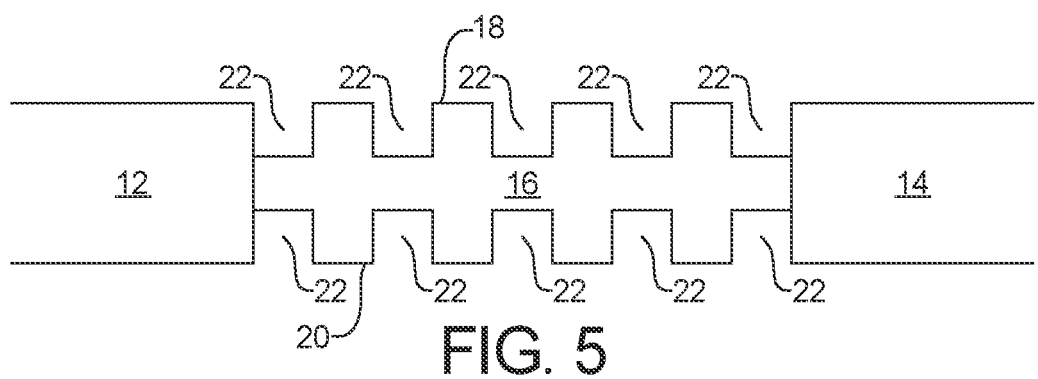
FIG. 5 is a side view of an automotive busbar, wherein a flexible section includes a double sided notched profile.
Figure 6:
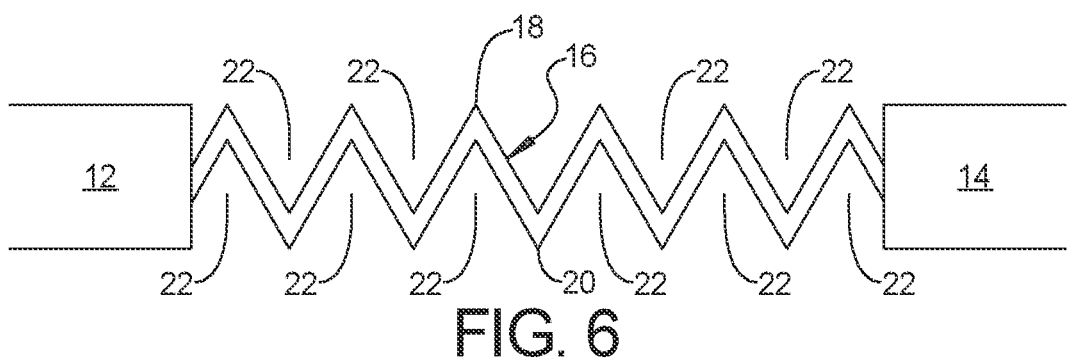
FIG. 6 is a side view of an automotive busbar, wherein a flexible section includes a triangular wave form profile.
Figure 7:
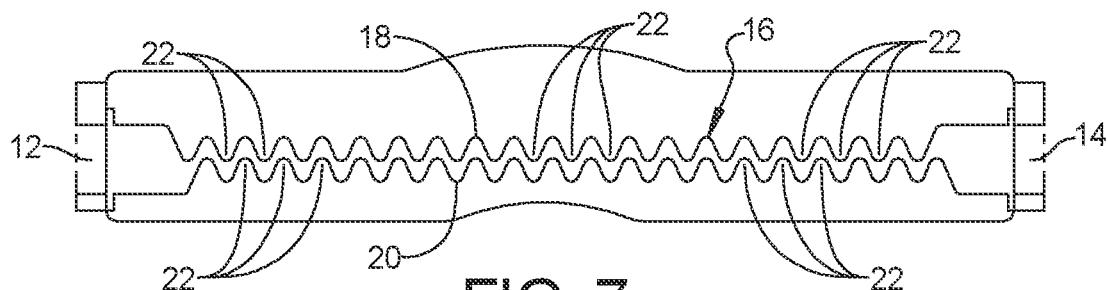
FIG. 7 is a side view of an automotive busbar, wherein a flexible section includes a sinusoidal wave form profile.

Referring again to FIG. 2 and FIG. 3, as discuss previously, the flexible section 16 includes a top surface 18 and a bottom surface 20. At least one of the top and bottom surfaces 18, 20 includes a plurality of voids 22 formed therein and spaced along the flexible section 16. As shown in FIG. 2 and FIG. 3, in an exemplary embodiment, the flexible section 16 comprises a square wave form profile. Referring to FIG. 4, in another exemplary embodiment, the flexible section 16 comprises a single-sided notched profile. Referring to FIG. 5, in another exemplary embodiment, the flexible section 16 comprises a double-sided notched profile. Referring to FIG. 6, in yet another exemplary embodiment, the flexible section 16 comprises a triangular wave form profile. Referring to FIG. 7, in still another exemplary embodiment, the flexible section 16 comprises a sinusoidal wave form profile.

Referring again to FIG. 1 and FIG. 2, the busbar 10 further includes a flexible insulation coating 24 encapsulating the flexible section 16 and filling the voids 22 formed therein. The busbar 10 further includes a similar flexible insulation 26 on the first and second rigid sections 12, 14. The flexible insulation coatings 24, 26 on both the first and second rigid sections 12, 14 and the flexible section 16 act to prevent the busbar 10 from shorting due to contact with external conductive surfaces within the automobile, thus ensuring proper power energy transfer through the busbar 10. The flexible insulation coatings 24, 26 on both the first and second rigid sections 12, 14 and the flexible section 16 further acts as a dampener to absorb vibrations experienced by the busbar 10 during operation of the automobile.

Figure 8:
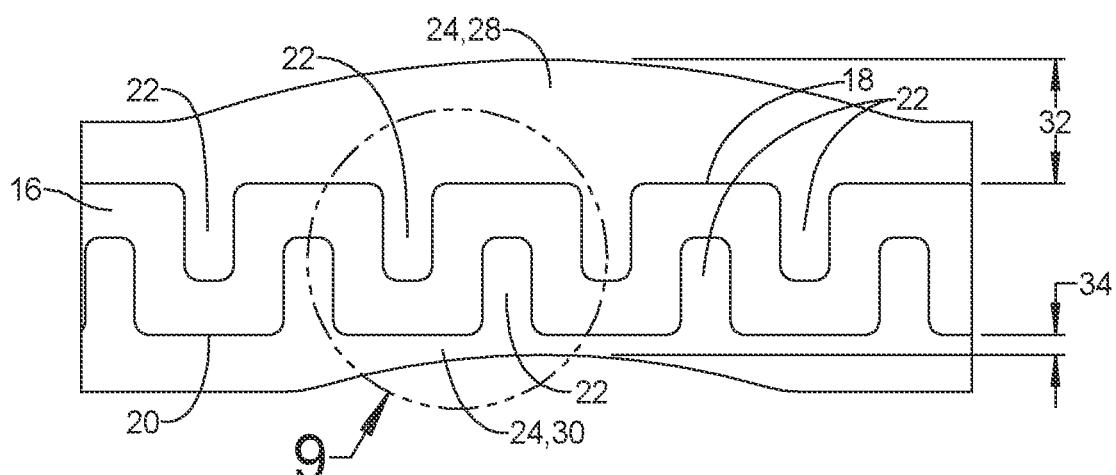
FIG. 8 is an enlarged portion of FIG. 2, as labelled "FIG. 8" in FIG. 2.

Referring to FIG. 8, in an exemplary embodiment, the flexible insulation coating 24 of the flexible section 16 has a first portion 28 adjacent one of the top and bottom surfaces 18, 20 that is thicker than a corresponding second portion 30 adjacent an opposite one of the top and bottom surfaces 18, 20. As shown in FIG. 8, a first portion 28 of the flexible coating 24 adjacent the top surface 18 of the flexible section 16 has a first thickness 32, and a second portion 30 of the flexible coating 24 adjacent the bottom surface 20 of the flexible section 16 has a second thickness 34 that is less than the first thickness 32. This will encourage bending of the flexible section 16 in one direction and provide resistance to bending of the flexible section 16 in an opposite direction. The thicker first portion 28 of the flexible coating 24 of the flexible section 16 adjacent the top surface 18 will provide resistance to upward bending of the flexible section 16. The thinner second portion 30 of the flexible coating 24 of the flexible section 16 adjacent the bottom surface 20 will encourage downward bending, as indicated by arrows 36 in FIG. 9.

Figure 9:
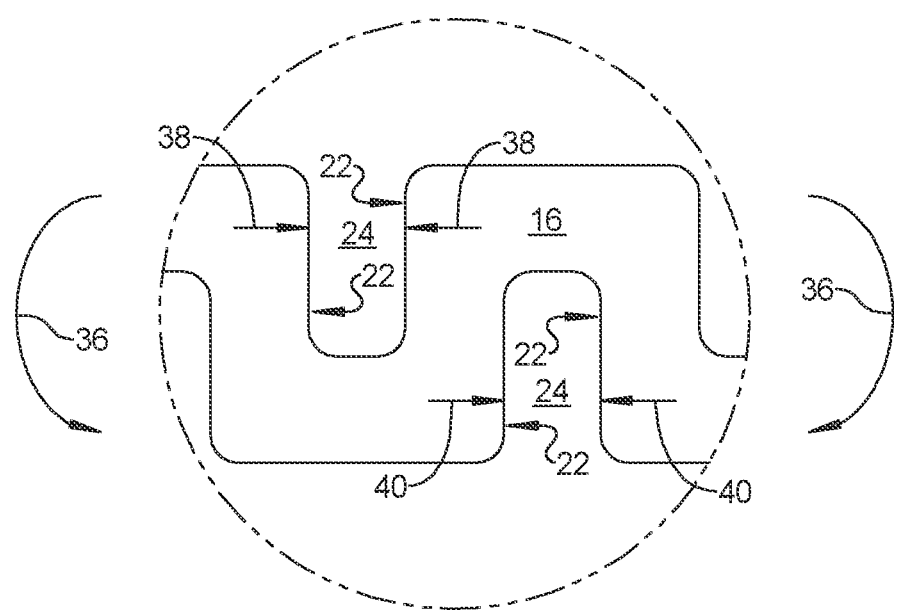
FIG. 9 is an enlarged portion of FIG. 8, as labelled "FIG. 9" in FIG. 8.

The flexible coating 24 of the flexible section 16 may be made from any suitable material, that will provide appropriate insulation, dampening and flexibility characteristics. In an exemplary embodiment, the flexible coating 24 of the flexible section 16 is a single piece of elastomeric material, such as, but not limited to, TPE or EPDM. The flexible coating 24 can be molded directly onto the flexible section 16, or molded to match the profile of the flexible section 16 and placed thereon. The flexible coating 24 of the flexible section 16 also provides structural support for the flexible section 16 of the busbar 10 and aids in allowing the flexible section 16 to be bent or folded, and then un-bent/un-folded to return to its original shape. Referring to FIG. 9, when the flexible section 16 is bent, as indicated by arrows 36, the flexible coating 24 within the voids 22 formed adjacent the top surface 18 is stretched, as indicated by arrows 38, and the flexible coating 24 within the voids 22 formed adjacent the bottom surface 20 is compressed, as indicated by arrows 40.

The flexible coating 24 on the flexible section 16 of the busbar 10 provides structural support to help ensure that the busbar 10 will hold its shape and will resist inadvertent bending. When sufficient force is applied to intentionally bend the flexible section 16 of the busbar 10, energy is absorbed by the stretched and compressed flexible coating 24 within the voids 22 of the flexible section 16. This energy is stored within the flexible coating 24 until the busbar 10 is bent/un-folded back to its original shape. The stored energy within the flexible coating 24 helps to encourage the flexible section 16 to bend back to its original shape without any resulting undesirable profiles. The material that is used for the flexible coating 24 of the flexible section 16 may be selected to provide calibrated resistance to bending.

A busbar 10 of the present disclosure offers several advantages. Most notably, a busbar 10 of the present disclosure can be folded into a more compact shape for insertion within a space within the automobile, and can be un-folded back to its proper shape to be secured in place within the automobile without any resulting undesirable profiles.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automotive busbar, comprising:
    a first rigid section made from a first conductive metallic material;
    a second rigid section made from the first conductive metallic material; and
    a flexible section made from a second conductive metallic material having a higher conductivity than the first conductive metallic material and positioned between and interconnecting the first and second rigid sections.

2. The busbar of claim 1, wherein the flexible section includes a top surface and a bottom surface, at least one of the top and bottom surface including a plurality of voids formed therein and spaced along the flexible section.

3. The busbar of claim 2, wherein the flexible section includes an effective cross-sectional area that is less than an effective cross-sectional area of the first and second rigid sections.

4. The busbar of claim 3, wherein the first and second rigid sections are made from aluminum and the flexible section is made from copper.

5. The busbar of claim 3, wherein the flexible section comprises a single-sided notched profile.

6. The busbar of claim 3, wherein the flexible section comprises a double-sided notched profile.

7. The busbar of claim 3, wherein the flexible section comprises a wave form profile.

8. The busbar of claim 7, wherein the flexible section comprises a square wave form profile.

9. The busbar of claim 7, wherein the flexible section comprises a triangular wave form profile.

10. The busbar of claim 7, wherein the flexible section comprises a sinusoidal wave form profile.

11. The busbar of claim 3, further including a flexible insulation coating encapsulating the flexible section and filling the voids formed therein.

12. The busbar of claim 11, wherein the flexible insulation coating has a portion adjacent one of the top and bottom surfaces that is thicker than a corresponding portion adjacent an opposite one of the top and bottom surfaces.

13. An automotive busbar, comprising:
    a first rigid section and a second rigid section, each of the first and second rigid sections formed from a first conductive metallic material and having a first effective cross-sectional area; and
    a flexible section positioned between and interconnecting the first and second rigid sections, the flexible section made from a second conductive metallic material and having:
        a second effective cross sectional area; and
        a top surface and a bottom surface, at least one of the top and bottom surface including a plurality of voids formed therein and spaced along the flexible section;
    wherein, the second effective cross-sectional area is less than the first effective cross-sectional area and the second conductive material has a higher conductivity than the first conductive material.

14. The busbar of claim 13, wherein the flexible section comprises one of a single-sided notched profile and a double-sided notched profile.

15. The busbar of claim 13, wherein the flexible section comprises one of a square wave form profile, a triangular wave form profile and a sinusoidal wave form profile.

16. The busbar of claim 13, further including a flexible insulation coating encapsulating the flexible section and filling the voids formed therein.

17. The busbar of claim 16, wherein the flexible insulation coating has a portion adjacent one of the top and bottom surfaces that is thicker than a corresponding portion adjacent an opposite one of the top and bottom surfaces.

18. An automobile having an automotive busbar, the automotive busbar comprising:

a first rigid section and a second rigid section, each of the first and second rigid sections formed from a first conductive metallic material and having a first effective cross-sectional area; and a flexible section positioned between and interconnecting the first and second rigid sections, the flexible section made from a second conductive metallic material and having:

a second effective cross sectional area; and a top surface and a bottom surface, at least one of the top and bottom surface including a plurality of voids formed therein and spaced along the flexible section;

wherein, the second effective cross-sectional area is less than the first effective cross-sectional area and the second conductive material has a higher conductivity than the first conductive material.

19. The automobile of claim 18, wherein the flexible section of the busbar comprises one of:

a single-sided notched profile;

a double-sided notched profile;

a square wave form profile;

a triangular wave form profile; and a sinusoidal wave form profile.

20. The automobile of claim 19, wherein the automotive busbar further includes a flexible insulation coating encapsulating the flexible section, filling the voids formed therein, and having a portion adjacent one of the top and bottom surfaces that is thicker than a corresponding portion adjacent an opposite one of the top and bottom surfaces.

* * * * *